United States Patent [19]
Itoh et al.

[11] Patent Number: 5,528,433
[45] Date of Patent: Jun. 18, 1996

[54] WIDE PICTURE VIDEO RECORDING/REPRODUCING SYSTEM

[75] Inventors: Shigeyuki Itoh, Kawasaki; Atsushi Yoshioka, Ebina; Iwao Aizawa; Michio Masuda, both of Yokohama, all of Japan

[73] Assignee: Hitachi, Ltd., Tokyo, Japan

[21] Appl. No.: 795,467

[22] Filed: Nov. 21, 1991

[30] Foreign Application Priority Data

Nov. 21, 1990 [JP] Japan .................................. 2-314019

[51] Int. Cl.⁶ ........................................ H04N 5/78
[52] U.S. Cl. .................... 360/35.1; 360/33.1; 360/64; 360/18; 358/335
[58] Field of Search ........................ 360/14.1, 14.2, 360/25, 27, 19.1, 35.1, 18, 33.1, 64; 358/180, 310, 335, 342; 348/445

[56] References Cited

U.S. PATENT DOCUMENTS

| | | | |
|---|---|---|---|
| 3,919,474 | 11/1975 | Benson | 360/14.1 X |
| 4,622,577 | 11/1986 | Reitmeier et al. | 358/11 |
| 4,768,106 | 8/1988 | Ito et al. | 360/19.1 X |
| 4,819,089 | 4/1989 | Wilkinson et al. | 360/19.1 X |
| 5,122,885 | 6/1992 | Yoshioka et al. | 358/310 |
| 5,150,218 | 9/1992 | Ezaki | 360/19.1 X |

FOREIGN PATENT DOCUMENTS

| | | |
|---|---|---|
| 0213911 | 3/1987 | European Pat. Off. . |
| 0411440 | 2/1991 | European Pat. Off. . |
| 0469805 | 2/1992 | European Pat. Off. . |

OTHER PUBLICATIONS

*Patent Abstracts of Japan*, vol. 7, No. 80 (E–168) [1225], Apr. 2, 1983 (for Japanese Kokai 58–6685).
*Patent Abstracts of Japan*, vol. 14, No. 537 (E–1006), Nov. 27, 1990 (for Japanese Kokai 2–228183).

*Primary Examiner*—Andrew L. Sniezek
*Attorney, Agent, or Firm*—Antonelli, Terry, Stout & Kraus

[57] ABSTRACT

A video tape recorder enables a normal video signal for an aspect ratio of 4:3 or a wide-picture video signal for a greater aspect ratio of, for example, 16:9 to be selectively recorded/reproduced onto and from a magnetic tape. In order to identify which of the aspect ratios the reproduced video signal is based on, a recording mode signal indicative of the aspect ratio is recorded on the magnetic tape together with the video signal. A code signal or a pilot signal is used for the recording mode signal. In the reproducing operation, the aspect ratio of a reproduced picture is recognized from the recording mode signal, and a signal indicative of the aspect ratio is delivered to an external device, such as a television set, together with reproduced video/audio signals. In a case where the reproduced picture is a wide picture and where the external device does not conform to the wide picture, the aspect ratio of the video signal is changed. A television set suited to the features of the video tape recorder is also disclosed.

6 Claims, 10 Drawing Sheets

EXAMPLE OF FORMAT OF RECORDING MODE SIGNAL

EXAMPLE OF CONTENTS OF RECORDING MODE SIGNAL

| BITS | CONTENTS | | |
|---|---|---|---|
| BIT 0 | BITS 0 1 | ASPECT RATIO OF INPUT SIGNAL | |
| | 0 0 : | 4:3 MOTION PICTURE | |
| " 1 | 0 1 : | 16:9 MOTION PICTURE | |
| " 2 | BITS 2 3 | INPUT DEVICE (MOTION PICTURE) | |
| | 0 0 : | CAMERA | |
| " 3 | 0 1 : | OTHER | |
| " 4 | BITS 4 5 | ASPECT RATIO OF STILL PICTURE | |
| | 0 0 : | 4:3 STILL PICTURE | |
| " 5 | 0 1 : | 16:9 STILL PICTURE | |
| " 6 | BITS 6 7 | INPUT DEVICE OF STILL PICTURE | |
| | 0 0 : | CAMERA | |
| " 7 | 0 1 : | OTHER | |

WIDE PICTURE VIDEO RECORDING/REPRODUCING SYSTEM

BACKGROUND OF THE INVENTION

The present invention relates to a video recording/reproducing system. More particularly, it relates to a video tape recorder or a television set which is well suited to record/reproduce or selectively display a so-called "wide video signal" based on an aspect ratio (width-to-height ratio) of, e.g., 16:9 or a video signal of the NTSC format, the PAL format or the like with an aspect ratio of 4:3.

At present, the aspect ratios of television screens conforming to the NTSC format, the PAL format, etc., are usually set at 4:3. However, various wide picture formats whose aspect ratios are 16:9, etc., have been proposed in order to enhance ambience.

In addition, a video camera can take a wide picture in such a way that a normal lens is replaced with a wide-angle lens for the aspect ratio of 16:9 (employing an anamorphic optical system or a fiber plate), as disclosed in Japanese Patent Application Laid-open (KOKAI) No. 61-121577.

Methods of recording the signals of such wide pictures are disclosed in Japanese Patent Application Publication (KOKOKU) No. 51-17249, Japanese Utility Model Registration Application Publication (KOKOKU) No. 58-53791, and others.

The prior art examples, however, concern how to record/reproduce these wide picture signals. None of them teach the discrimination between a wide picture signal and a normal or conventional picture signal which are recorded on an identical tape, or the connection between a VTR capable of recording both wide and normal picture signals and a television (TV) set capable of selectively displaying them.

SUMMARY OF THE INVENTION

An object of the present invention is to provide, in a wide picture video recording/reproducing system which can record and reproduce both a wide picture signal and a normal picture signal, a system which is capable of the discrimination between the recorded signals, the connection thereof with a TV set, etc., and is accordingly convenient to users.

In order to the accomplish the above object, in one aspect of the present invention, a video tape recorder for recording and reproducing video signals onto and from a magnetic tape comprises means for selectively accepting, as an input video signal, a video signal for a first aspect ratio (which is a width-to-height ratio of a screen) and a video signal for a second aspect ratio greater than the first aspect ratio for a wider screen; aspect ratio discrimination means for determining the aspect ratio of the input video signal; means for generating a recording mode signal indicative of the result obtained from said aspect ratio discrimination means; and recording means provided with a plurality of rotary recording heads, for recording the recording mode signal together with the input video signal onto said magnetic tape by the use of said rotary recording heads.

In an example, the recording mode signal contains a code which represents the aspect ratio, and said recording means records the recording mode signal on an area on said magnetic tape which differs from a recording area for the video signal by the use of said rotary recording heads.

In another example, the recording mode signal is a pilot signal of fixed frequency which indicates the second aspect ratio, and said recording means records the input video signal, which contains a pilot signal which is frequency-multiplexed within a vertical retrace time, onto said magnetic tape.

The video tape recorder may further comprise means for receiving a television broadcast signal and a "wide" decoder which decodes the television signal into video and audio baseband signals and which produces a signal indicative of the aspect ratio of the video signal.

In operation, the aspect ratio of the video signal accepted as an input signal is determined, and the recording mode signal indicative of the aspect ratio of the input video signal is generated in accordance with the determined result. Then, this recording mode signal is recorded in a recording area which is different from the video signal recording area, whereby the recording mode can be automatically determined during the recording and reproducing operations without degrading the picture quality of the recorded video signal. Alternatively, the pilot signal for determining the recording mode is generated on the basis of the determined result of the aspect ratio of the video signal accepted as an input signal, and it is frequency-multiplexed on the "wide" video signal in the vertical retrace time thereof, whereby the recording mode can be automatically determined during recording and reproducing operations without degrading the picture quality of the recorded video signal.

Further, it is convenient to users for the aspect ratio of the output video signal to be automatically changed on the basis of the determined result of the aspect ratio of the input video signal during the recording operation, or the determined result of the aspect ratio of the reproduced signal during the reproducing operation, and a "wide" device identifying signal transmitted from an external device.

The constructional features and advantages of the present invention other than the above will be readily understood from the following detailed description of the invention taken in conjunction with the accompanying drawings.

DETAILED DESCRIPTION OF THE PREFERRED EMBODIMENTS

Now, embodiments of the present invention will be described with reference to the drawings.

Figure 1:
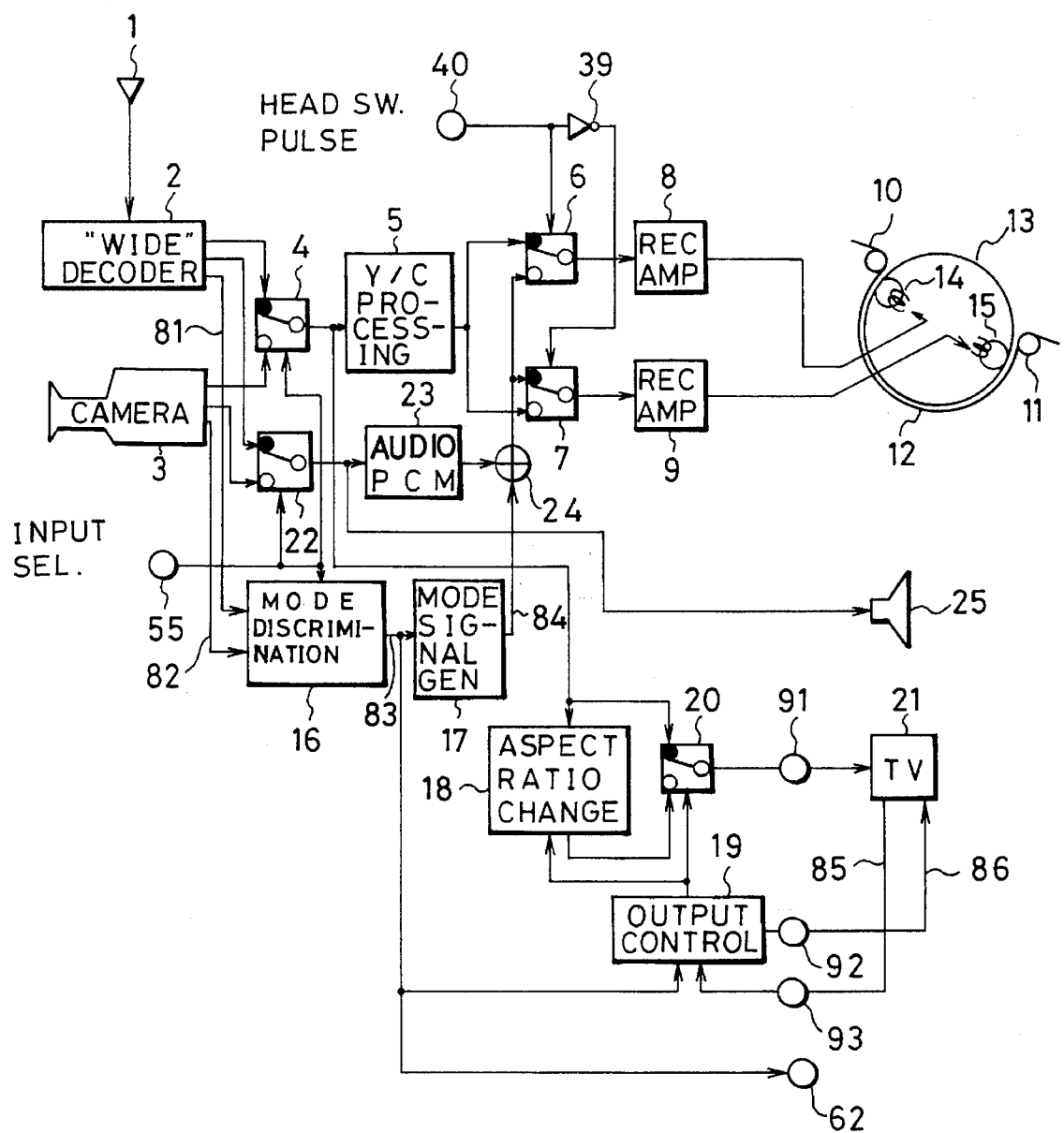
FIG. 1 is a block diagram showing an embodiment of the recording section of a VTR.

FIG. 1 is a block diagram showing an embodiment of the recording section of an 8 mm-tape VTR to which the present invention is applied.

Referring to FIG. 1, the recording section in this embodiment includes a TV antenna 1, a "wide" decoder 2 by which a wide-picture RF signal transmitted from a TV station is demodulated into a baseband signal, and a video camera 3 which can take a wide picture. Numerals 4 and 22 designate change-over switches, respectively. A luminance/chrominance recording processing circuit 5 subjects a luminance signal to FM (frequency modulation), and subjects a chrominance signal to frequency conversion into a low-frequency chrominance signal. Numerals 6 and 7 indicate change-over switches respectively, while numerals 8 and 9 indicate recording amplifiers (REC amplifiers), respectively. This recording section also includes tape guides 10, 11, a magnetic tape 12, a rotary drum 13, and rotary video heads 14, 15 of different azimuth angles. A mode discrimination circuit 16 acts as first means for determining the aspect ratio of the input signal, and a circuit 17 generates a recording mode signal corresponding to the output of the mode discrimination circuit 16. An aspect ratio change circuit 18 changes the aspect ratio from 16:9 to 4:3. Numeral 19 denotes an AND circuit as an output control circuit, and numeral 20 a change-over switch. Shown at numeral 21 is a television (TV) set which is connected to the VTR. This embodiment also includes an audio PCM encoder circuit 23, an adder circuit 24 and a loudspeaker 25. Further, it includes an inverter 39 and an input terminal 40 for a head switching pulse. An input terminal 55 is supplied with an input selection signal for controlling the operations of the change-over switches 4 and 22, while an output terminal 62 supplies the result of the mode discrimination (aspect ratio determination) from the mode discrimination circuit 16. Numerals 91, 92 and 93 represent input/output terminals for transferring signals between the VTR and the TV set 21.

It should be noted that the input terminals 40, 55 and the output terminal 62 serve to transfer the signals to and from other circuit blocks (not shown) included in the VTR, and they are not for connections with external devices.

The RF signal received via the antenna 1 is demodulated by the "wide" decoder 2 into a video baseband signal and an audio baseband signal, which are supplied as outputs. The "wide" decoder 2 functions to decode both the RF signals of a wide picture and a normal picture. Here, in a case where the received RF signal is a wide picture signal, a mode signal 81 indicating that it is a wide-picture signal is further supplied as an output. On the other hand, the video camera 3 produces a video baseband signal and an audio baseband signal, together with a mode signal 82 for indicating whether it is operating in the wide or normal mode. The output signals of either the "wide" decoder 2 or the video camera 3 are selected by the change-over switches 4 and 22 on the basis of the input selection signal applied via the input terminal 55, and are accepted as inputs by the VTR. The accepted video signal is converted into VTR input signals (an FM luminance signal, and a low-frequency converted chrominance signal) by the luminance/chrominance recording processing circuit 5. Thereafter, these signals are passed through the REC amplifiers 8 and 9 as well as the change-over switches 6 and 7 controlled on the basis of the head switching pulse which is received via the input terminal 40, and they are recorded on the magnetic tape 12 as shown in FIG. 2 by the rotary video heads 14, 15.

Meanwhile, the audio signal is converted into a PCM signal by the audio PCM processing circuit 23. One of the wide/normal mode signals (aspect ratio discriminating signals) 81 and 82 respectively supplied from the "wide" decoder 2 and the video camera 3 is selected based on an input selection signal from the input terminal 55 and used for the mode discrimination (aspect ratio discrimination) by the mode discrimination circuit 16, the output 83 of which is applied to the recording mode signal generator circuit 17. Then, this circuit 17 produces a recording mode signal 84 for identifying the input signal (for determining the aspect ratio) in correspondence with the output 83 of the circuit 16. Incidentally, the mode discrimination (aspect ratio discrimination) result output 83 of the mode discrimination circuit 16 is supplied from the output terminal 62 so that it can be used, for example, to display the aspect ratio of the selected input signal by means of an indicator configured of LEDs or the like.

The audio PCM signal from the circuit 23 and the recording mode signal 84 from the circuit 17 are added by the adder circuit 24. Thereafter, they are passed through the REC amplifiers 8 and 9 as well as the change-over switches 6 and 7 controlled on the basis of the head switching pulse, and they are recorded in those areas on the magnetic tape 12 which are different from the area used for recording the video signal by the rotary video heads 14 and 15.

Figure 2:
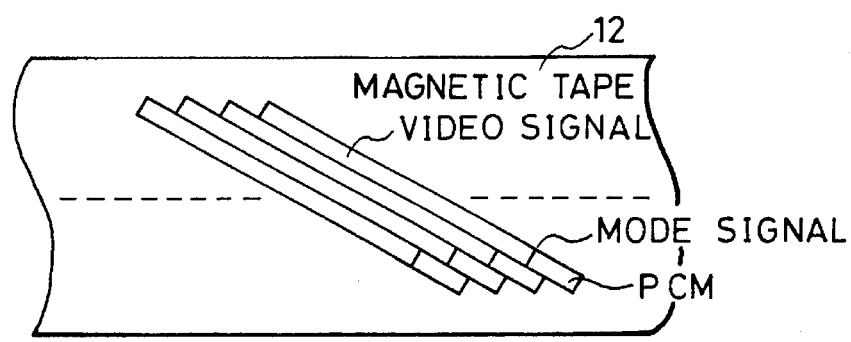
FIG. 2 is a diagram showing an example of a recording pattern for the VTR.

FIG. 2 illustrates the aspect in which the individual signals are recorded on the magnetic tape 12. As is well known, the recording areas of the video signal and the PCM signal based on the plurality of rotary recording heads of different azimuth angles extend along a plurality of adjacent tracks which are diagonal to the edges of the magnetic tape 12. One field of the video signal is recorded in one slanted track of the recording area by one of the rotary heads. The recording area for one field is divided into the two areas for recording the video signal and the PCM audio signal, and the mode signal is further recorded in between these two areas in this embodiment.

Referring back to FIG. 1, the monitor output of the video signal selected by the change-over switch 4 is automatically changed-over between the wide signal form of 16:9 and the normal signal form of 4:3 in accordance with whether the TV set 21 is a wide TV or a normal or conventional TV. The automatic change-over is effected in such a way that the aspect ratio change circuit 18 and the change-over switch 20 are controlled by the output control circuit 19 which is supplied with a wide TV identifying signal 85 (for example, "H (high level)" for the wide TV) sent from the TV set 21 as will be described later, and the output signal 83 of the mode discrimination circuit 16 (the discriminated result of the aspect ratio of the input signal). That is, only when the input signal is a wide one and the TV set 21 is a normal one will the output control circuit 19 produce an output control signal so as to operate the aspect ratio change circuit 18 for changing the aspect ratio from 16:9 to 4:3 and to operatively connect the change-over switch 20 to the side of the aspect ratio change circuit 18. Further, when the video signal outputted from the change-over switch 20 is a wide picture signal, the output control circuit 19 supplies an identification signal 86 indicative of the wide signal to the external device such as TV set 21 and controls the change-over switch 20 so as to supply the wide signal to the external device.

Accordingly, the wide TV necessitates the function (element 72 in FIG. 3 to be described later) of producing the wide device identifying signal 85 indicative of the wide TV, and an input terminal (66 in FIG. 3 to be described later) for receiving the identification signal (the discrimination signal for the aspect ratio of the input signal) 86 indicating that the input signal is a wide video baseband signal. Also, on the VTR side, the input terminal 93 is needed for receiving the wide TV identifying signal 85. The function of delivering the wide device identifying signal 85 and the input terminal for the aspect ratio discriminating signal 86, as explained above in relation to the wide TV, are similarly required in devices having a wide format, for example, a video printer.

Figure 3:
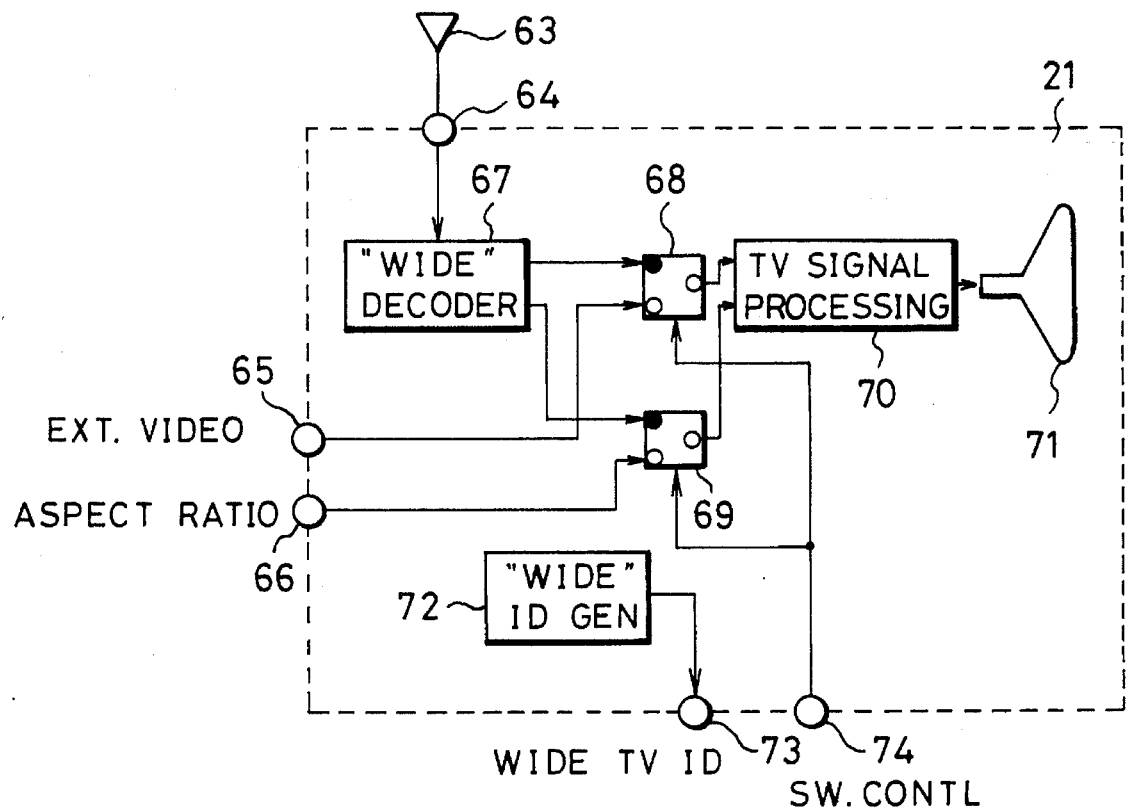
FIG. 3 is a block diagram showing an embodiment of a TV set.

FIG. 3 is a block diagram showing an embodiment of the TV set 21.

Referring to FIG. 3, this TV set 21 includes an antenna input terminal 64 connected to a TV antenna 63, and an input terminal 65 for an external video signal. The input terminal 66 receives the signal (86) indicating the aspect ratio of the external input signal. In addition, this embodiment includes a "wide" decoder 67 by which a wide-picture RF signal transmitted from a TV broadcast station is decoded into a baseband signal. Numeral 68 designates a change-over switch for video signal inputs, numeral 69 a change-over switch for aspect ratio identifying signals, and numeral 70 a TV signal processing circuit for displaying the video signal on a cathode-ray tube 71. The circuit 72 generates the wide TV identifying signal (85) indicative of the wide TV, and this is then output via an output terminal 73. Shown at numeral 74 is an input terminal for receiving a control signal which serves to control the change-over switches 68, 69 and which is supplied from another circuit block (not shown) within the TV set 21.

The TV signal processing circuit 70 in the wide TV set has its operations changedover in accordance with the aspect ratio of the video signal accepted as the input. By way of example, when the video signal based on the aspect ratio of 4:3 is input, the processing circuit 70 executes the process of altering the horizontal scanning range and blacking out both the side edges of the wide screen.

Figures 4A, 4B:
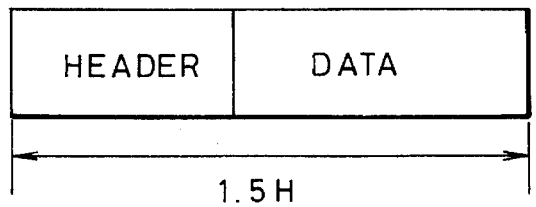
FIGS. 4A and 4B are diagrams for explaining an example of a recording mode signal.

FIGS. 4A and 4B show an example of the format of the recording mode signal (84 in FIG. 1). As illustrated in FIG. 4A, the recording mode signal consists of a header part and a data part. In this example, the data part is composed of 8 bits as illustrated in FIG. 4B. More specifically, the aspect ratio of an input motion picture is indicated by bits 0 and 1, the input device (a camera or otherwise) of the motion picture by bits 2 and 3, the aspect ratio of an input still picture (to be described later) by bits 4 and 5, and the input device of the still picture by bits 6 and 7.

Figure 5:
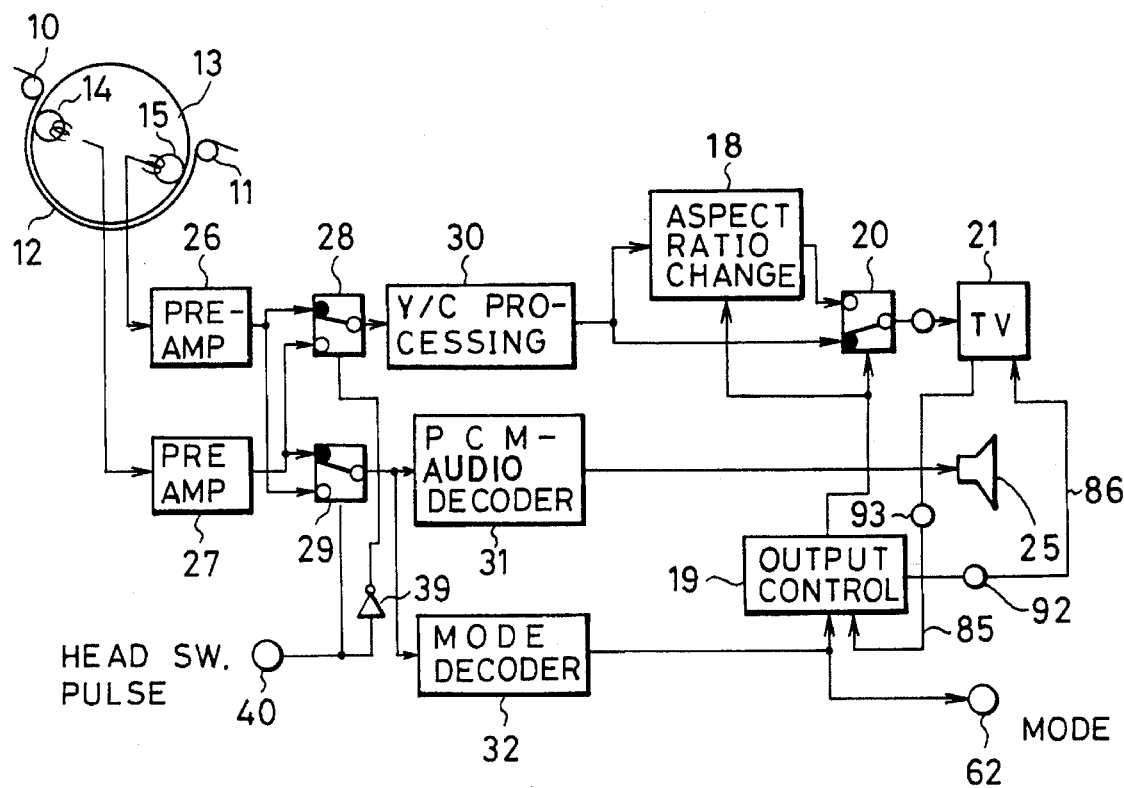
FIG. 5 is a block diagram showing an embodiment of the reproducing section of the VTR which is suitable for use with the recording section in FIG. 1.

FIG. 5 is a block diagram showing a second embodiment of the reproducing section of the 8 mm-tape VTR to which the present invention is applied. Incidentally, elements with the same functions as in FIG. 1 have the same numerals assigned thereto and shall be omitted from the description.

Referring to FIG. 5, this reproducing section includes reproducing amplifiers (PRE amplifiers) 26, 27, and change-over switches 28, 29 which are controlled by a head switching pulse. Numeral 30 indicates a luminance/chrominance reproduction processing circuit by which an FM luminance signal reproduced from a magnetic tape 12 is subjected to FM demodulation, while a low-frequency converted chrominance signal is subjected to frequency conversion back to its original band. A PCM-audio decoder circuit 31 decodes a PCM audio signal into a voice or audio signal. A mode decoder 32 acts as a second aspect ratio discrimination means for determining the aspect ratio (wide or normal) of the reproduced signal on the basis of a reproduced recording mode signal.

Signals reproduced from the magnetic tape 12 by rotary video heads 14 and 15 are amplified by the PRE amplifiers 26 and 27. Thereafter, they are divided by the change-over switches 28 and 29 into a signal consisting of the reproduced FM luminance signal and low-frequency chrominance signal, and the recording mode signal as well as the PCM signal. The reproduced FM luminance signal and low-frequency chrominance signal are demodulated into a video signal by the luminance/chrominance reproduction processing circuit 30. The PCM signal is also decoded by the PCM-audio decoder circuit 31 into the audio signal, which is eventually emitted from a loudspeaker 25.

In the mode decoder 32, whether the reproduced signal to be displayed is a wide picture signal or a normal picture signal (in other words, the aspect ratio of the reproduced signal) is determined on the basis of the reproduced recording mode signal (for example, the signal as shown in FIGS. 4A and 4B). The result of the determination is delivered to an output control circuit 19 and an output terminal 62. The output control circuit 19 controls an aspect ratio change circuit 18 and a change-over switch 20 on the basis of the determined mode result of the mode decoder 32 and a wide TV identifying signal 85 sent from a TV set 21. Further, when the output signal from the mode decoder 32 indicates a wide signal, the output control circuit 19 supplies an identification signal 86 indicative of the wide signal to an external device such as the TV set 21 and controls the change-over switch 20 so as to supply the wide signal to the external device.

Incidentally, the output of the mode decoder 32 applied to the output control circuit 19 and the output of the mode discrimination circuit 16 of the recording section shown in FIG. 1 are subjected to a logical sum operation within this output control circuit 19.

Figure 6:
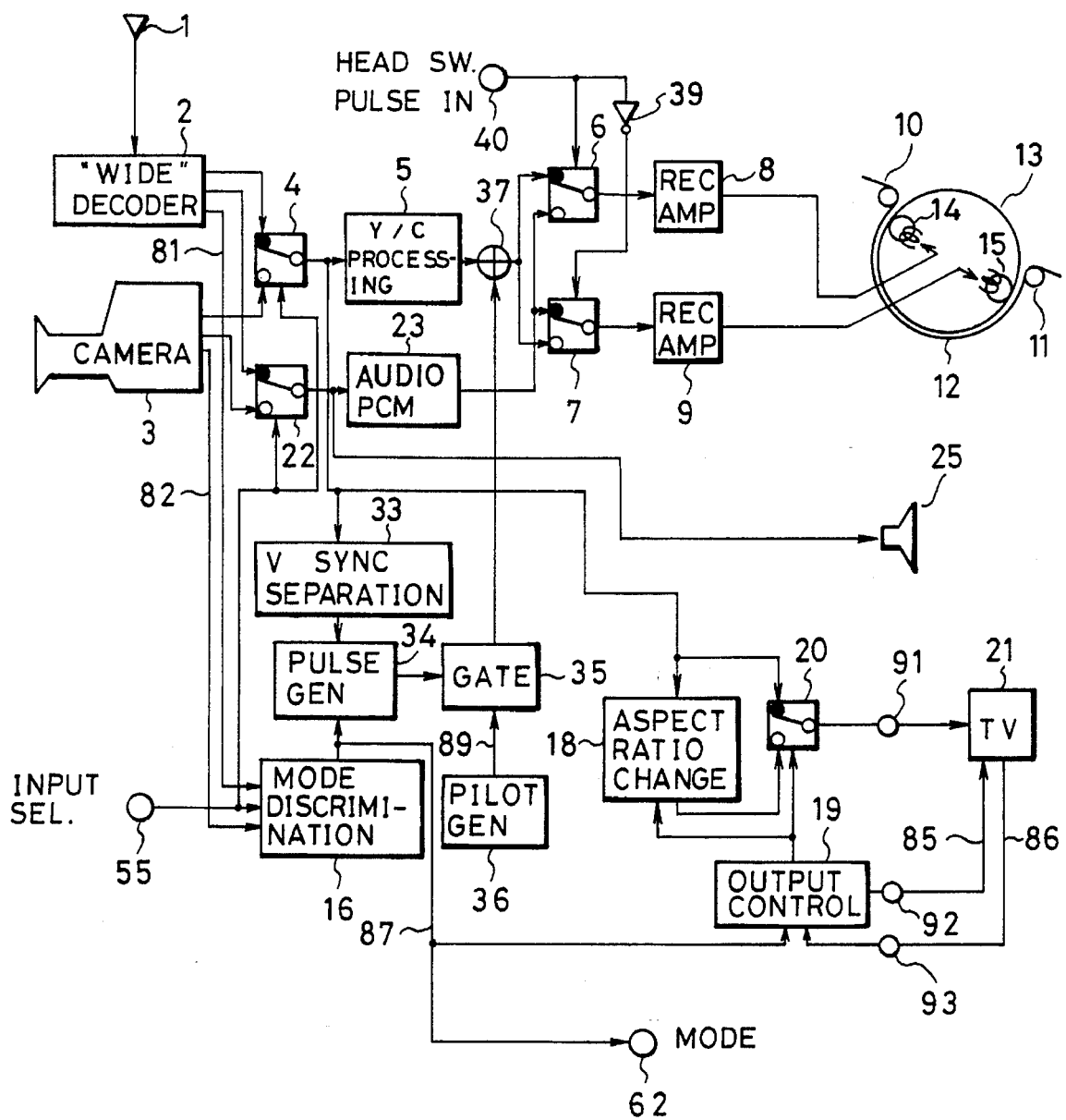
FIG. 6 is a block diagram showing a second embodiment of the recording section of a VTR.

FIG. 6 is a block diagram showing the second embodiment of the recording section of a VTR to which the present invention is applied. Elements with the same functions as in FIG. 1 have the same numerals assigned thereto and shall be omitted from the description. Although this embodiment is independent of the embodiment shown in FIG. 1, both can be adopted in combination. Referring to FIG. 6, this recording section includes a V (vertical) sync separator circuit 33, a pulse generator circuit (pulse GEN) 34, and a gate circuit 35. A circuit 36 generates a pilot signal 89 for discriminating between wide or normal mode (aspect ratio) in order to identify a wide picture signal. Numeral 37 designates an adder circuit.

In a case where the discriminated mode result of a mode discrimination circuit 16 indicates a wide signal, the wide-signal identifying pilot signal 89 produced by the pilot signal generator circuit 36 is subjected to frequency multiplexing in the vertical retrace period of a video signal by the adder circuit 37. More specifically, the pulse GEN 34 is supplied with the discriminated result from the mode discrimination circuit 16 (the discriminated result of the aspect ratio of an input signal) and the output signal of the V sync separator circuit 33 for detecting the vertical sync of the input video signal. When the input video signal is a wide signal, this pulse GEN 34 produces a pulse signal which enables the gate circuit 35 during the vertical retrace period only. Thus, the wide-signal identifying pilot signal 89 produced by the pilot signal generator circuit 36 is sent to the adder circuit 37 during only the vertical retrace time due to the operation of the gate circuit 35.

Here, the pilot signal 89 is preferably set at a frequency of, for example, 29.25 fh (≈460 kHz) for the NTSC format or 28.875 fh (≈450 kHz) for the PAL format so as to have a frequency-interleaved relationship to the luminance signal.

With the above construction, the pilot signal is frequency multiplexed within only the vertical retrace period when no chrominance signal component is involved and which concerns the mere sync of the luminance signal. Therefore, the detection of the reproduced pilot signal is less liable to be disturbed by the side-band component of the FM luminance signal, and it is difficult to err in the detection. A further advantage is that the picture quality of the video signal is not degraded by the addition of the pilot signal.

Figure 7:
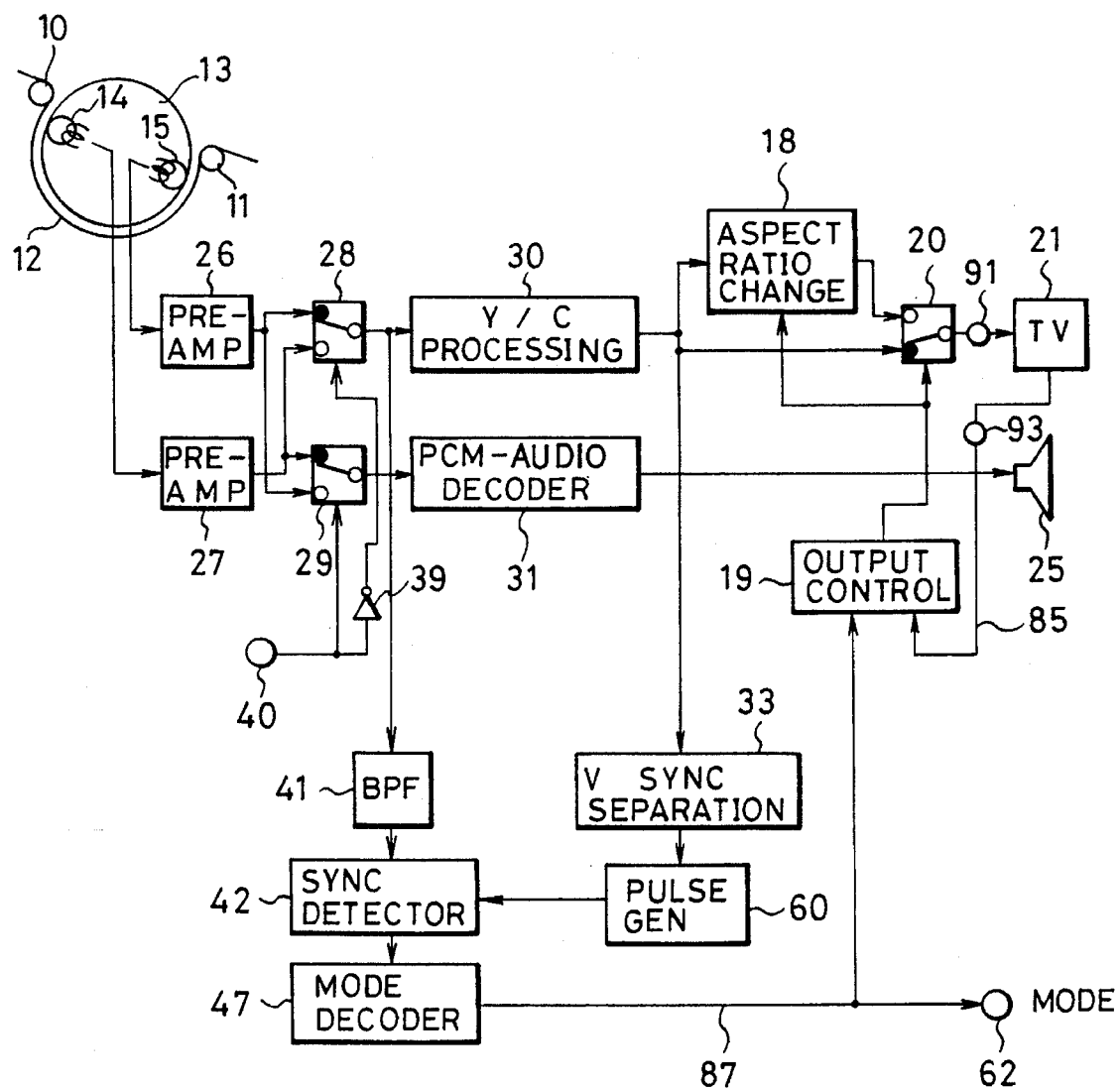
FIG. 7 is a block diagram showing an embodiment of the reproducing section of the VTR which is suitable for use with the recording section in FIG. 6.

FIG. 7 is a block diagram showing an embodiment of the reproducing section of the VTR which is suitable for use with the recording section illustrated in FIG. 6. Elements with the same functions as in FIGS. 1, 5 and 6 have the same numerals assigned thereto and shall be omitted from this description.

Referring to FIG. 7, this reproducing section includes a band-pass filter (BPF) 41 which extracts a pilot signal from a reproduced signal, a sync detector circuit 42 which serves to detect the pilot signal, a mode decoder 47 which determines whether the recorded signal is a wide or a normal picture signal (the aspect ratio) on the basis of the output of the sync detector circuit 42, and a pulse generator circuit 60 which produces a pulse during the vertical retrace time on the basis of the output signal of a V (vertical) sync separator circuit 33.

The pilot signal indicative of the aspect ratio of a recorded signal is detected in such a way that a signal extracted by the BPF 41 is detected during the vertical retrace time by the sync detector circuit 42. Owing to this detecting method, even when the recording level of the pilot signal is sharply lowered (it is set at or below −25 dB relative to the recording level of a luminance signal), the pilot signal can be detected without error because the energy of the side-band of the FM-luminance signal is low during the vertical retrace period. Further, since the recording level of the pilot signal is low, any degradation of the vertical sync attributable to the pilot signal can be prevented. The mode decoder 47 determines the aspect ratio of the reproduced signal in accordance with the presence or absence of the pilot signal detected by the sync detector circuit 42. An output control circuit 19 manages the aspect ratio of the video signal to be displayed and produces a control signal for a change-over switch 20 on the basis of the determined result 87 of the aspect ratio and a wide-TV identifying signal 85 sent from a TV set 21.

According to this method, the recorded position of the wide signal on a magnetic tape can be found merely in accordance with the presence or absence of the pilot signal. Therefore, it can be readily detected by a high-speed search without performing complicated control for the traveling speed of the tape (a reel servo control) such that the frequency of the reproduced signal becomes constant, or the like.

Figure 8:
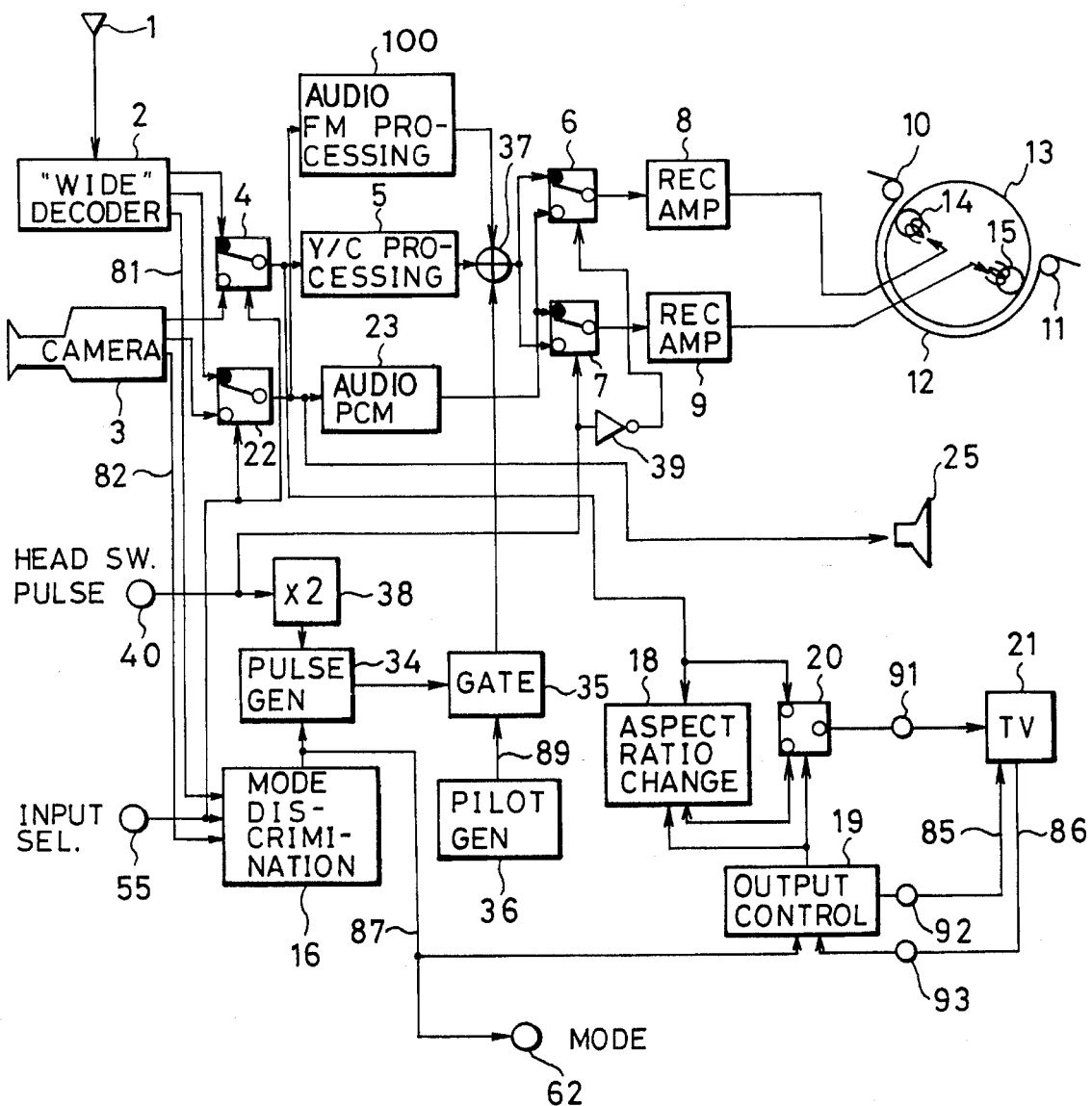
FIG. 8 is a block diagram showing a third embodiment of the recording section of a VTR.

FIG. 8 is a block diagram showing a third embodiment of the recording section of a VTR to which the present invention is applied. Elements with the same functions as in FIGS. 1 and 6 have the same numerals assigned thereto and shall be omitted from description.

Referring to FIG. 8, this recording section includes a multiply-by-2 circuit 38 and an audio FM circuit 100 by which an audio signal is subjected to FM for recording.

The audio signal selected by an input change-over switch 22 is encoded, on one hand, into a PCM signal by an audio PCM encoder circuit 23, and on the other hand, into a FM audio signal by the audio FM circuit 100. The resulting signals are respectively recorded in the corresponding recording areas as shown in FIG. 2.

Besides, in a case where the discriminated mode result 87 of a mode discrimination circuit 16 (the determination of the aspect ratio of an input signal) indicates a wide picture signal, a wide-signal identifying pilot signal 89 produced by a pilot signal generator circuit 36 is subjected to frequency multiplexing during the vertical retrace period of a video signal by an adder circuit 37. More specifically, a pulse GEN (generator) 34 is supplied with the discriminated result 87 from the mode discrimination circuit 16 and a head switching pulse multiplied by 2 (the output of the multiply-by-2 circuit 38), the pulse having a fixed phase relative to the vertical sync of the input video signal. Only when the input video signal is a wide signal will this pulse GEN 34 produces a pulse signal which enables a gate circuit 35 during the vertical retrace period. Thus, the wide-signal identifying pilot signal 89 produced by the pilot signal generator circuit 36 is sent to the adder circuit 37 only during the vertical retrace period by the operation of the gate circuit 35.

As stated before, the pilot signal 89 is preferably set at the frequency of, for example, 29.25 fH (≈460 kHz) for the NTSC format or 28.875 fH (≈450 kHz) for the PAL format so as to have the frequency-interleaved relationship to a luminance signal.

With the above construction, the pilot signal is frequency-multiplexed within only the vertical retrace period in which no chrominance signal component is involved and which concerns the mere sync of the luminance signal. Therefore, the detection of the reproduced pilot signal is less liable to be disturbed by the side-band component of the FM-luminance signal, and it is difficult to err in the detection. As a further advantage, even when the recording level of the pilot signal is increased (it is set at −10 dB or so relative to the recording level of the luminance signal) in order to prevent the erroneous detection, the picture quality of the video signal is not degraded because the pilot signal is added only in the vertical retrace time.

Figure 9:
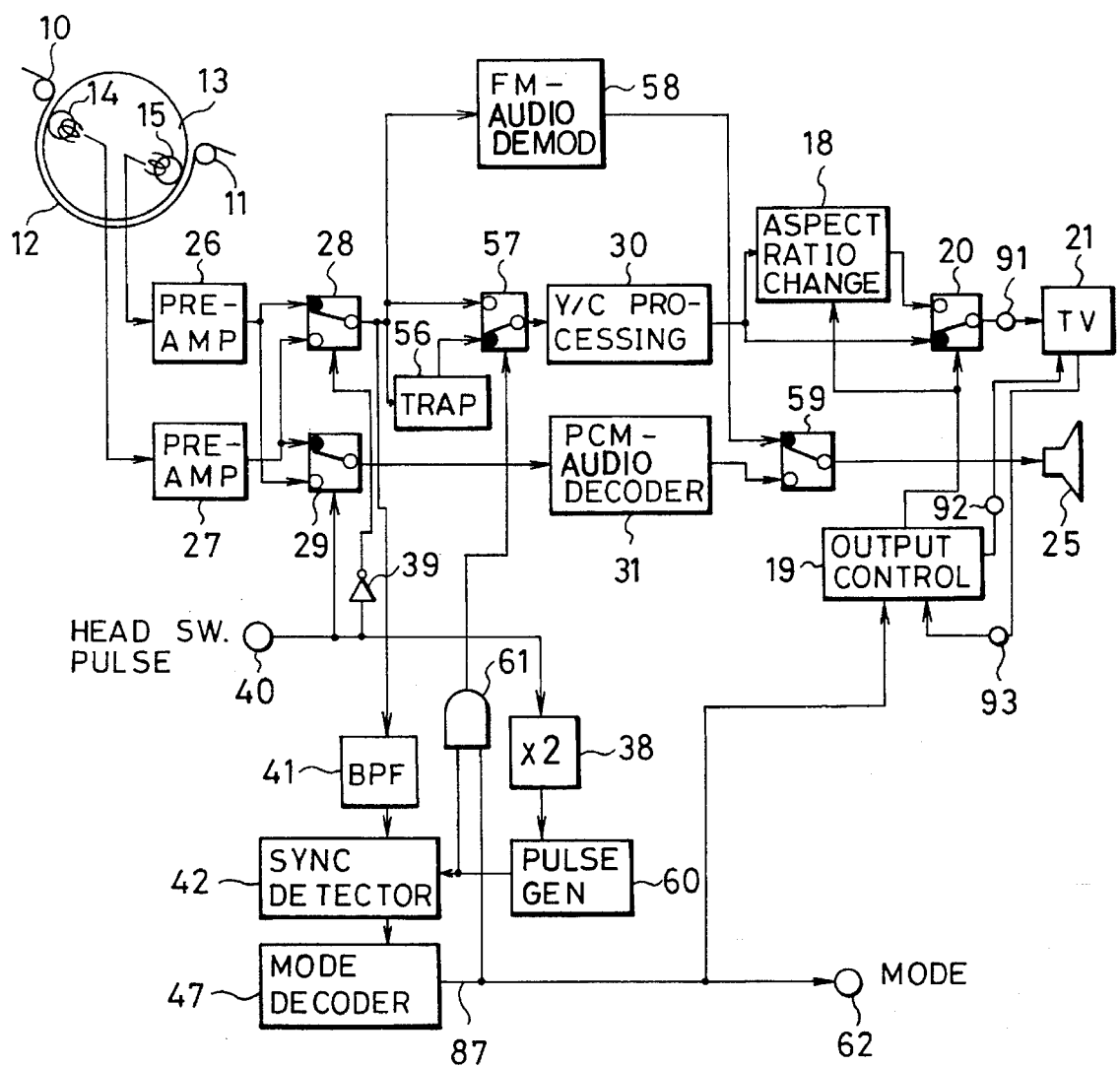
FIG. 9 is a block diagram showing an embodiment of the reproducing section of the VTR which is suitable for use with the recording section in FIG. 8.

FIG. 9 is a block diagram showing an embodiment of the reproducing section of the VTR which is suitable for use with the recording section illustrated in FIG. 8. Elements with the same functions as in FIGS. 1, 5, 6, 7 and 8 have the same numerals assigned thereto and shall be omitted from this description.

Referring to FIG. 9, this reproducing section includes a trap 56 for removing a pilot signal, and a switch 57 for turning the trap 56 ON/OFF. Also, it includes an FM-audio demodulator circuit 58 for demodulating an FM-audio signal, and a switch 59 for selecting one of the demodulated audio signal of a PCM-audio signal and the FM-audio signal. A pulse GEN (generator circuit) 60 produces a pulse corresponding to the vertical retrace time on the basis of a head switching signal multiplied-by-2 (the output of a multiply-by-2 circuit 38). Shown at numeral 61 is an AND circuit which takes the logical product between the output of the pulse GEN 60 and the output 87 of a mode decoder 47.

The FM-audio signal in a reproduced signal delivered from a switch 28 is demodulated into the audio signal by the FM-audio demodulator circuit 58. Meanwhile, when the input video signal is a wide picture signal, the FM luminance signal and a low-frequency converted chrominance signal have the pilot signal removed during only the vertical retrace time by the trap 56 owing to a pulse generated by the AND circuit 61. Thus, the pilot signal multiplexed in the vertical retrace period is prevented from disturbing the vertical sync signal in a reproducing operation.

Further, the pilot signal extracted from the reproduced signal by a BPF (band pass filter) 41 is detected during only the vertical retrace period by a sync detector circuit 42 so as to discriminate the aspect ratio of the reproduced signal.

With the expedient of FIG. 9 adopting the trap 56, even when the recording level of the pilot signal is somewhat increased (it is set at −10 dB or so relative to the recording level of the luminance signal) in order to prevent the erroneous detection, the pilot signal can be prevented from disturbing the vertical sync, and the degradation of a reproduced picture quality, etc., do not occur.

Figure 10:
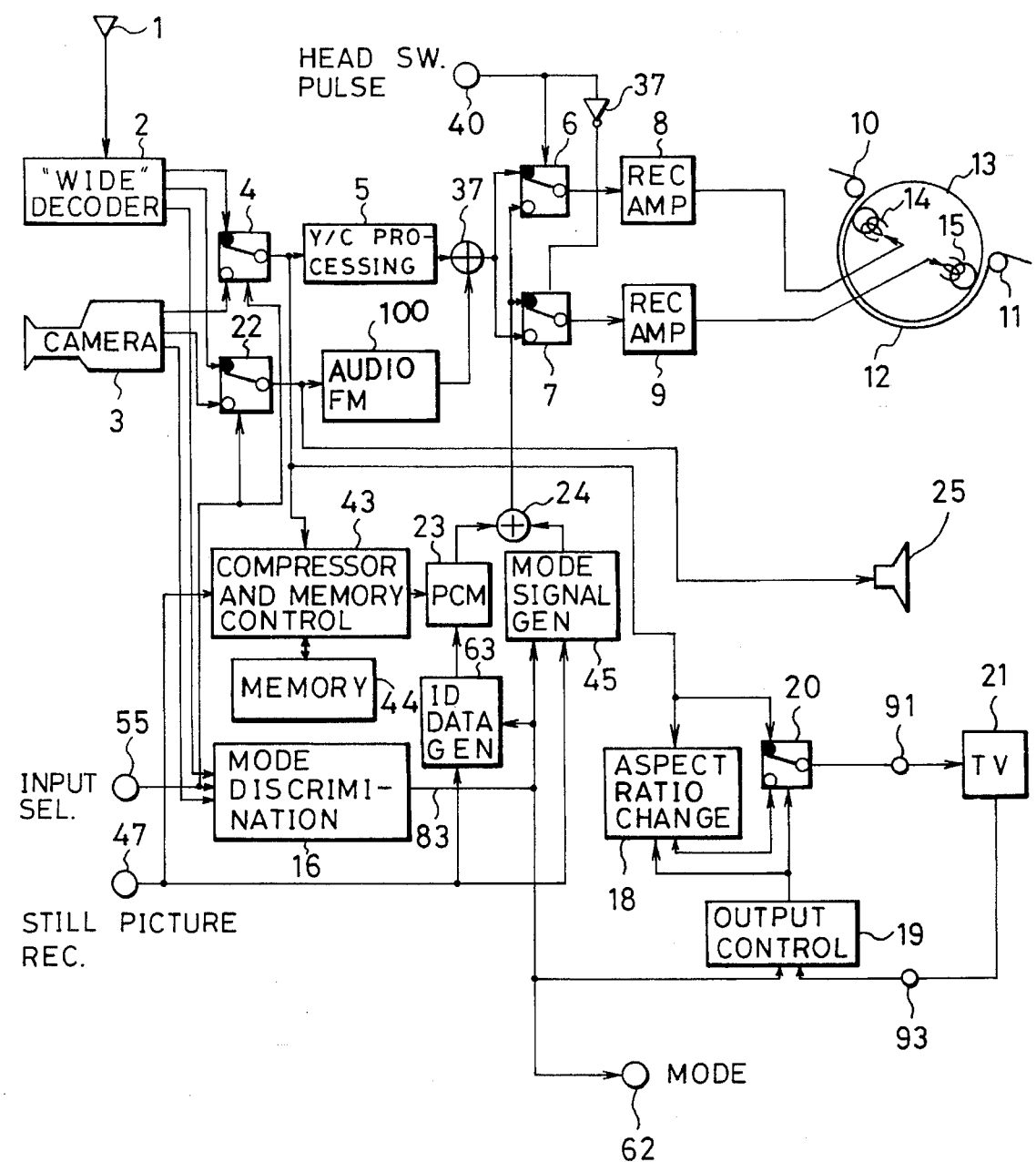
FIG. 10 is a block diagram showing a fourth embodiment of the recording section of a VTR.

FIG. 10 is a block diagram showing a fourth embodiment of the recording section of a VTR to which the present invention is applied. Elements with the same functions as in FIGS. 1, 6 and 8 have the same numerals assigned thereto and shall be omitted from this description.

Referring to FIG. 10, this recording section includes a picture data compressor and memory control circuit 43 in which a video signal of one field or one frame is converted into digital data, and the quantity of the data is compressed by a technique such as DPCM (differential PCM) or sub-sampling so as to transfer the compressed data to a PCM encoder 23 at low speed. The video signal of one field or one frame is stored in a memory 44. A circuit 45 generates a recording mode signal in accordance with the output 83 of a mode discrimination circuit 16 and the signal (to be described below) of a recording operation for a digital still picture. An input terminal 47 is supplied with the digital-still-picture recording operation signal indicative of the recording of the digital still picture. A circuit 63 generates ID data which indicates that the digital still picture is to be recorded in the PCM recording area and that the digital still picture is a wide picture.

The output signal of a "wide" decoder 2 or a video camera 3 is selected by change-over switches 4 and 22 on the basis of an input selection signal from an input terminal 55. On one hand, the selected signal is accepted as the input of the VTR and is subjected to recording processing. On the other hand, that picture of the input video signal which impresses a user favorably is selected with the digital-still-picture recording operation signal from the input terminal 47, and it is converted into the digital data of one field or one frame (for example, data of 8 bits/4 fsc where fsc denotes a chrominance signal carrier frequency, which is about 3.58 MHz in the NTSC format) by the picture data compressor and memory control circuit 43. The digital data is stored in the memory 44. The digital video data is compressed by the DPCM, the sub-sampling or the like method in the picture data compressor and memory control circuit 43, and the compressed data is transferred to the PCM encoder 23 at the low speed so as to conform to the processing speed of this PCM encoder. Further, when the signal to be recorded is a wide picture signal or when the digital still picture is to be recorded, the wide-mode identifying signal delivered from the recording mode signal generator circuit 45 is recorded in the area between the video area and the PCM area as shown in FIG. 2, or the digital-still-picture recording mode signal, namely, the ID data delivered from the ID data generator circuit 63, is recorded in the PCM area together with the PCM data. The digital-still-picture data of a field or a frame is usually recorded over PCM recording areas of a plurality of tracks because the compressed data is still more than can be recorded in one PCM recording area.

Incidentally, the format of the recording mode signal in this embodiment is as illustrated in FIGS. 4A and 4B. The provision of the information of the aspect ratio of the still picture on both the recording mode signal and the output signal of the ID data generator circuit 63 is intended to establish a compatibility with another system which has only either of wide and normal modes.

In this manner, the wide-signal identifying signal and the digital-still-picture recording mode signal are recorded in the two different areas, i.e., the mode signal recording area and the PCM recording area. Therefore, rewriting only the video signal (such as erasing or inserting the video signal), rewriting only the digital still picture, etc., can be done at will. This is based on the fact that the mode signal recording area can be recorded and reproduced without regard to the video signal and the PCM signal.

Figure 11:
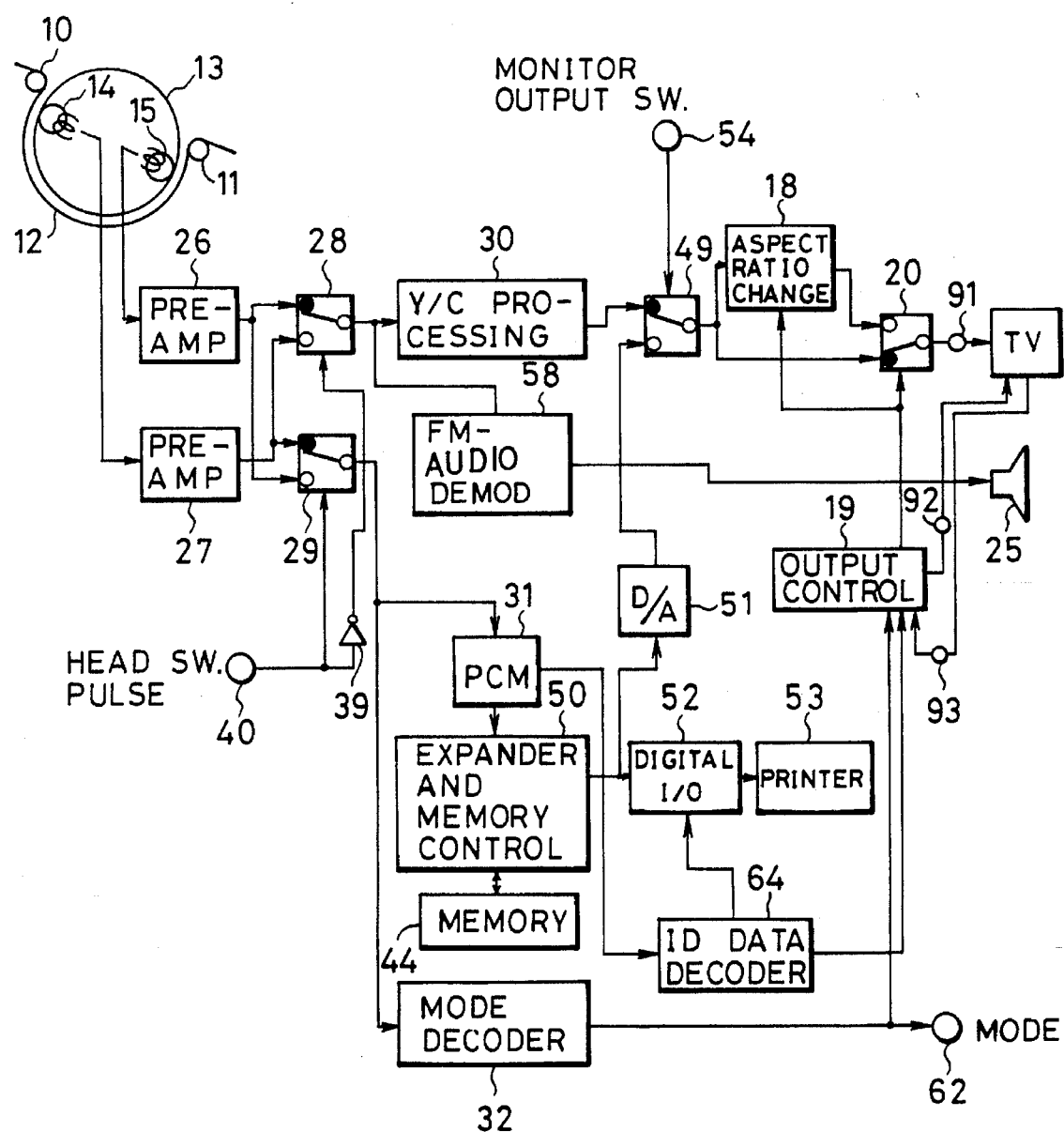
FIG. 11 is a block diagram showing an embodiment of the reproducing section of the VTR which is suitable for use with the recording section in FIG. 10.

FIG. 11 is a block diagram showing an embodiment of the reproducing section of the VTR which is suitable for use with the recording section illustrated in FIG. 10. Constituents with the same functions as in FIGS. 1, 5, 6, 7, 8, 9 and 10 have the same numerals assigned thereto and shall be omitted from this description.

Referring to FIG. 11, this reproducing section includes a picture data expander and memory control circuit 50 in which still picture data decoded by a PCM decoder 31 is expanded into original picture data so as to restore a video signal of one field or one frame. This embodiment also includes a digital-to-analog converter (D/A) 51, a digital interface (digital I/O) 52, a printer 53, and an ID data decoder 64.

A PCM signal reproduced from a PCM area is decoded by the PCM decoder 31 into the still picture data compressed in a recording operation. The compressed still picture data thus obtained is expanded into the original picture signal by the picture data expander and memory control circuit 50 so as to restore the video signal of one frame or one field. The restored video signal is supplied to a monitor output change-over switch 49 via the D/A 51. On the other hand, the digital picture data restored is supplied to the printer 53 via the digital I/O 52. Owing to such a digital data connection, a picture which is substantially free from any degradation (a picture as taken by a camera) can be printed out.

Here, ID data in the PCM signal is decoded by the ID data decoder 64, whereby the aspect ratio of the still picture signal to be displayed is determined.

A recording mode signal reproduced from a recording mode signal area is applied to a mode decoder 32, whereby the aspect ratio of the reproduced picture signal is determined. The aspect ratio of a reproduced still picture signal may be determined based on the recording mode signal.

On the basis of the discriminated result of the aspect ratio of the reproduced still picture signal and that of the aspect ratio of the reproduced picture signal an output control circuit 19 operates to automatically changeover the output aspect ratios of a motion picture and a still picture.

As described above, according to the present invention, the aspect ratio of a video signal accepted as an input is determined, a recording mode signal indicative of the aspect ratio of the signal to be recorded is generated in accordance with the discriminated result, and this recording mode signal is recorded in a recording area different from a video signal recording area, whereby a recording mode can be automatically determined in recording and reproducing operations without degrading the picture quality of the recorded video signal.

As an alternative expedient of the present invention, a pilot signal for discriminating the recording mode is generated on the basis of the discriminated result of the aspect ratio of the video signal accepted as an input, and it is recorded and reproduced in a frequency-multiplexed manner the vertical retrace period of the "wide" video signal, whereby the recording mode can be automatically discriminated in the recording and reproducing operations without degrading the picture quality of the recorded video signal.

Besides, in a video recording/reproducing system wherein a digital still picture is recorded in an area different from the video signal recording area, the wide signal identifying signal and the signal of a recording mode for the digital still picture are recorded in two different areas: the mode signal recording area and a PCM recording area. This brings forth the advantage that rewriting only the video signal (such as erasing or inserting the video signal), rewriting only the digital still picture, etc., can be done at will.

Further, the aspect ratio of the output video signal is automatically changed on the basis of the discriminated result of the aspect ratio of the input video signal in the recording operation or the discriminated result of the aspect ratio of the reproduced signal in the reproducing operation and a "wide" device identifying signal transmitted from an external device. This is convenient to users.

What is claimed is:

1. A video tape recorder for recording and reproducing video signals onto and from a magnetic tape, comprising:

accepting means for selectively accepting, as a video signal to be recorded, a video signal for a first aspect ratio (width-to-height ratio of a screen) and a video signal for a second aspect ratio greater than the first aspect ratio for a wider screen;

aspect ratio discrimination means for determining the aspect ratio of the video signal to be recorded;

means for generating a recording mode signal indicative of a result obtained from said aspect ratio discrimination means;

recording means provided with a plurality of rotary heads for recording the recording mode signal and the video signal to be recorded onto said magnetic tape by the use of said rotary heads; and supplying means for supplying the recording mode signal and the video signal to be recorded to said recording means such that the recording mode signal is one of
(1) inserted in a vertical retrace interval of the video signal to be recorded in response to a head switching signal for sequentially activating said rotary heads, and
(2) recorded in a recording area on said magnetic tape which differs from a video signal recording area used for recording the video signal to be recorded, wherein the recording mode signal contains a code which represents the aspect ratio of the video signal to be recorded;

wherein said aspect ratio discrimination means is first aspect ratio discrimination means, wherein said recording means sequentially activates said rotary heads in response to a head switching signal, and wherein said supplying means includes:

means for generating a pulse signal indicative of a vertical retrace period of the video signal to be recorded based on the head switching signal; and means responsive to the pulse signal for multiplexing the recording mode signal with the video signal to be recorded by inserting the recording mode signal in the vertical retrace period of the video signal to be recorded, thereby producing a multiplexed recording mode signal and video signal;

wherein said recording means records the multiplexed recording mode signal and video signal onto said magnetic tape by the use of said rotary heads; and wherein the recording mode signal further contains a code which represents a type of an input device which is adapted to be used for inputting the video signal to be recorded to the accepting means.

2. A video tape recorder for recording and reproducing video signals onto and from a magnetic tape, comprising:

first accepting means for selectively accepting, as a video signal to be recorded, a video signal for a first aspect ratio (width-to-height ratio of a screen) and a video signal having a second aspect ratio greater than the first aspect ratio for a wider screen;

first aspect ratio discrimination means for determining the aspect ratio of the video signal to be recorded;

second accepting means for selectively accepting, as a still picture signal to be recorded, a still picture signal for the first aspect ratio and a still picture signal for the second aspect ratio;

second aspect ratio discrimination means for determining the aspect ratio of the still picture signal to be recorded;

means for generating a first recording mode signal indicative of a result obtained from the first aspect ratio discrimination means and a result obtained from the second aspect ratio discrimination means;

means for digitizing the still picture signal to be recorded; and recording means provided with a plurality of rotary heads for recording the video signal to be recorded in a video recording area on the magnetic tape by the use of the rotary heads, recording the digitized still picture signal in a PCM recording area on the magnetic tape by the use of the rotary heads, the PCM recording area being separate from the video recording area, and recording the first recording mode signal in an area on the magnetic tape between the video recording area and the PCM recording area by the use of the rotary heads.

3. A video tape recorder according to claim 2, wherein the first recording mode signal includes information indicative of respective types of input devices from which the video signal to be recorded and the still picture signal to be recorded were obtained.

4. A video tape recorder according to claim 2, further comprising:

means for generating a second recording mode signal indicative of the result obtained from the second aspect ratio discrimination means;

wherein the recording means records the second recording mode signal in the PCM recording area together with the digitized still picture signal by the use of the rotary heads.

5. A video tape recorder according to claim 2, further comprising:

means for reproducing the recorded video signal, the recorded digitized still picture signal, and the recorded first recording mode signal from the magnetic tape by the use of the rotary heads to produce a reproduced video signal, a reproduced digitized still picture signal, and a reproduced first recording mode signal;

third aspect ratio discrimination means for determining the aspect ratio of the reproduced video signal;

fourth aspect ratio discrimination means for determining the aspect ratio of the reproduced digitized still picture signal;

means for supplying the reproduced video signal and the reproduced digitized still picture signal to an external device;

means for receiving from the external device information as to whether the external device is a "wide" device or not; and first aspect ratio changing means responsive to the information received from the external device and a result obtained from the third aspect ratio discrimination means for changing the aspect ratio of the reproduced video signal supplied to the external device from one of the first aspect ratio and the second aspect ratio indicated by the result obtained from the third aspect ratio discrimination means to the other of the first aspect ratio and the second aspect ratio.

6. A video tape recorder according to claim 5, further comprising second aspect ratio changing means responsive to the information received from the external device and a result obtained from the fourth aspect ratio discrimination means for changing the aspect ratio of the reproduced digitized still picture signal supplied to the external device from one of the first aspect ratio and the second aspect ratio indicated by the result of the fourth aspect ratio discrimination means to the other of the first aspect ratio and the second aspect ratio.

* * * * *